(No Model.)

W. J. ALLASON.
NUT LOCK.

No. 476,769. Patented June 14, 1892.

Witnesses
W. C. Coolice
J. W. Adams

Inventor
William J. Allason
By Coburn & Thacher
Attys.

UNITED STATES PATENT OFFICE.

WILLIAM J. ALLASON, OF CHICAGO, ILLINOIS.

NUT-LOCK.

SPECIFICATION forming part of Letters Patent No. 476,769, dated June 14, 1892.

Application filed March 30, 1892. Serial No. 427,024. (No model.)

*To all whom it may concern:*

Be it known that I, WILLIAM J. ALLASON, a citizen of the United States, residing at Chicago, in the county of Cook and State of Illinois, have invented a certain new and useful Improvement in Nut-Locks, which is fully set forth in the following specification, reference being had to the accompanying drawings, in which—

Figure 1:
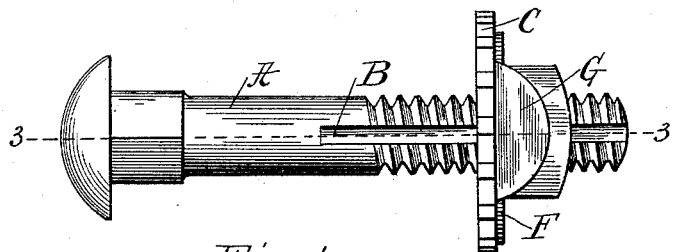
Figure 2:
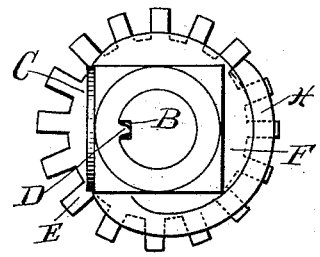
Figure 3:
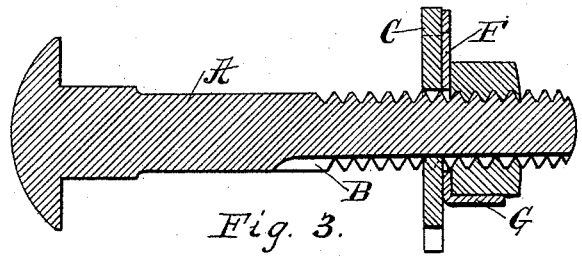
Figure 4:
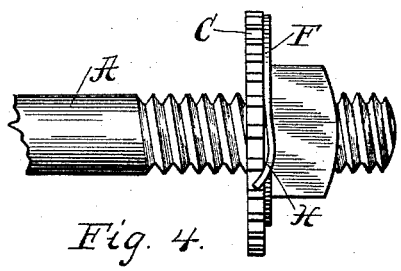
Figure 5:
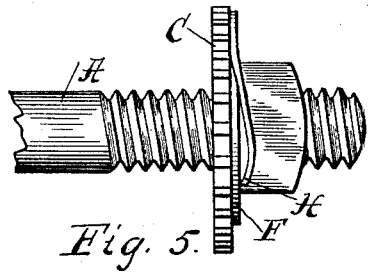
Figure 6:
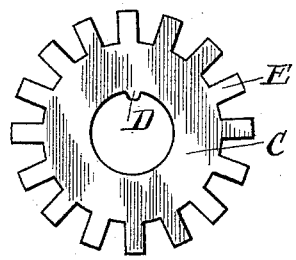
Figure 7:
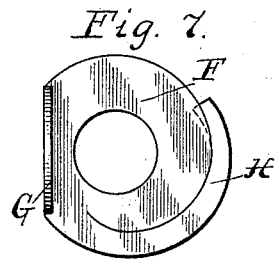
Figure 8:
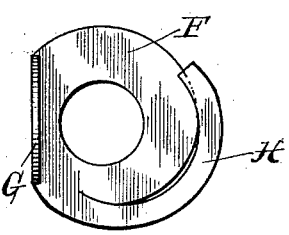
Figure 9:
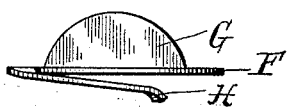

Figure 1 is a side elevation of my nut-lock as applied to a bolt. Fig. 2 is an end view of the nut and nut-lock when applied to a bolt. Fig. 3 is a vertical central sectional view of the same, taken at the line 3 3, Fig. 1. Fig. 4 is a plan view of the nut-lock, showing the nut locked on the end of the bolt. Fig. 5 is the same view showing the locking-pawl locked back in position for the nut to be turned from the bolt. Fig. 6 is a side elevation of the washer removed from the bolt. Fig. 7 is a side view of the locking-washer with the pawl in position to engage with the toothed washer. Fig. 8 is the same view of the locking-washer with the locking-pawl locked back over the edge of the locking-washer; and Fig. 9 is an edge view of the locking-washer, showing the normal position of the spring-plate pawl.

The object of my invention is to make a universal nut-lock that can be applied to lock any nut at any desired position on the bolt and readily unlock the locking device which locks the nut on the bolt and remove the nut or turn it to any desired position and replace it on the nut, using the same locking device any number of times.

My invention consists in the special construction of the various parts which I hereinafter describe and make the subject-matter of the claim.

In the accompanying drawings, A represents a bolt, made in any of the usual or well-known forms of bolts. This bolt is provided with a longitudinal groove B.

C is a toothed washer, with a central hole through it large enough to pass onto the end of the bolt, and it has a lug or spline D, which fits into the groove B, sliding longitudinally therein when the toothed washer is slipped onto the end of the bolt. This spline and groove prevent the washer from turning on the bolt. The washer C has teeth E upon its outer edge around its entire circumference, as clearly shown in Fig. 6.

F is a second washer, which I term a "locking-washer." It also has a central hole sufficiently large to pass upon the threaded end of the bolt. This locking-washer has upon one side of it a flange G, turned up substantially at right angles to the body of the washer. It also carries a spring-metal pawl-plate H, which is preferably integral with the washer instead of being made separately and attached to the washer. I have shown it in Figs. 7 and 8 as being integral with the washer; but it is made sufficiently long to admit of the locking end springing back and forth quite a distance, and it is made wide at the point of attachment to the body of the washer to give it strength. This spring-metal plate locking-pawl H is curved in such a shape that its free end passes under the edge of the locking-washer F and is held in its normal position some distance from the washer, so that it will engage with the teeth E of the toothed washer before the locking-washer comes in contact with the toothed washer. When the spring-metal locking-pawl is thrown back, its free end will lock over the edge of the locking-plate F, as clearly shown in Figs. 5 and 8, and the nut, with the locking-plate, can be readily removed from the bolt without injury to any part of either of the devices used.

In using my invention the bolt A is inserted in the bolt-hole in the metal or wooden piece or pieces. The toothed washer is then slipped on the threaded end of the bolt, the lug or spline D passing into groove B. The nut is then placed in position on the locking-washer, so that the flange G rests against one side of the nut, and the nut and washer are turned upon the end of the bolt until the locking-washer F approaches the toothed washer C, when the free end of the spring-plate pawl H will engage with the teeth E of the toothed plate C and admit of the nut being only turned in the direction to screw it tightly upon the end of the bolt. The nut cannot work loose or be removed so long as the free end of the spring-plate pawl H engages with the teeth E of the toothed plate because of the spline-and-groove connection between the toothed plate and the bolt.

When it is desired to remove the nut from the bolt, the free end of the spring-plate pawl H is thrown back, disengaging it from the teeth E of the toothed washer C and over the edge of the locking-plate F, where it is held locked, when the nut can be readily removed from the end of the bolt. The same locking-plate can be used again by simply releasing the free end from its locked position on the edge of the locking-plate F, and this spring-plate pawl will engage with the teeth E on the toothed washer and lock the nut in position, as above described.

I am aware that toothed washers have been used before in connection with a locking-washer in nut-locks; but I am the first to use a spring-plate locking-pawl capable of being thrown back from the teeth of the toothed washer and locked over the edge of the locking-washer to readily remove the nut from the bolt without in any way injuring any part of the locking mechanism and be capable of repeated and continued use, as above described.

My nut-lock is applicable to any bolt by simply providing the screw-threaded end of the bolt with a groove, as above described.

My nut-lock is almost universal in its application and it is very readily applied, readjusted, and is capable of repeated use. The spring-plate pawl H can be readily locked and unlocked by any simple tool or instrument by which it can be thrown back, disengaging its free end from the teeth E of the toothed washer and locked over the edge of the locking-washer. I find that this can be readily done with a knife-blade, a screw-driver, or any implement of that character without any injury whatever to the locking-pawl H or any other part of the nut-locking device.

Having fully described the construction and operation of my invention, what I claim as new, and desire to secure by Letters Patent, is—

In a nut-lock, the locking-plate F, having a portion turned upward to engage with the nut and a portion cut from its circumference to make a spring-metal pawl H, which has its free end curved under the edge of the locking-plate and adapted to engage with teeth on the circumference of the toothed washer and sufficiently long to be thrown back and locked on the edge of the locking-plate, the washer-plate C, having teeth on its periphery adapted to engage with the free end of the locking-pawl H, suitable mechanisms for locking the toothed washer to prevent it from rotating on the bolt, and a bolt and nut, as specified and shown.

WILLIAM J. ALLASON.

Witnesses:
ALOYSIA HELMICH,
L. L. COBURN.